US006625679B1

(12) United States Patent
Morrison et al.

(10) Patent No.: US 6,625,679 B1
(45) Date of Patent: Sep. 23, 2003

(54) APPARATUS AND METHOD FOR CONVERTING INTERRUPT TRANSACTIONS TO INTERRUPT SIGNALS TO DISTRIBUTE INTERRUPTS TO IA-32 PROCESSORS

(75) Inventors: John A. Morrison, Ft. Collins, CO (US); Michael S. Allison, Ft. Collins, CO (US); Leo J. Embry, Ft. Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/294,927

(22) Filed: Apr. 19, 1999

(51) Int. Cl.[7] .......................... G06F 13/24; G06F 13/36
(52) U.S. Cl. ...................... 710/260; 710/261; 710/306
(58) Field of Search ................................. 710/260, 261, 710/262, 264, 266, 268, 269, 48, 306; 709/238, 245, 246, 249, 250, 251, 252, 253, 200, 201

(56) References Cited

U.S. PATENT DOCUMENTS

| 5,428,799 A | | 6/1995 | Woods et al. ............... 710/266 |
|---|---|---|---|
| 5,560,018 A | | 9/1996 | Macon, Jr. et al. ......... 710/260 |
| 5,568,613 A | * | 10/1996 | Futral .......................... 709/249 |
| 5,745,772 A | * | 4/1998 | Klein .......................... 710/266 |
| 5,778,236 A | * | 7/1998 | Gephardt et al. ............ 710/266 |
| 5,862,366 A | * | 1/1999 | Schmidt et al. ............. 710/260 |
| 5,918,057 A | * | 6/1999 | Chou et al. .................. 710/260 |
| 5,930,487 A | * | 7/1999 | Story et al. .................. 710/120 |
| 6,006,301 A | * | 12/1999 | Tetrick ........................ 710/128 |
| 6,023,732 A | * | 2/2000 | Moh et al. ................... 709/232 |
| 6,205,508 B1 | * | 3/2001 | Bailey et al. ................ 710/260 |
| 6,308,255 B1 | * | 10/2001 | Gorishek, IV et al. ...... 712/209 |

* cited by examiner

Primary Examiner—Peter Wong
Assistant Examiner—Tim Vo

(57) ABSTRACT

An apparatus and method for distributing interrupts to Intel® Architecture (IA)-32 processors includes a system bus having a number of nodes. Each node includes a bridge that couples the system bus to a processor bus. The processor bus may include multiple IA-32 processors. The system bus may include any number of nodes. Interrupt transactions appearing on the system bus are converted by the bridge to interrupt signals. The bridge asserts the interrupt signals at one of two pins on a target IA-32 processor. One pin may be programmed to receive non-maskable interrupts and the other pin may be programmed to receive external interrupts. The bridge incorporates a priority and threshold mechanism. The bridge includes a buffer to store pending interrupt signals. The apparatus and method may be used in a mixed IA-32 and IA-64 computer architecture that uses IA-64 components to receive interrupts and uses the bridge to convert the transactions on an IA-64 bus into interrupt signal assertions to an IA-32 processor.

21 Claims, 7 Drawing Sheets

APPARATUS AND METHOD FOR CONVERTING INTERRUPT TRANSACTIONS TO INTERRUPT SIGNALS TO DISTRIBUTE INTERRUPTS TO IA-32 PROCESSORS

TECHNICAL FIELD

The invention is directed to an apparatus and a method that distributes interrupts. In particular, the invention is directed to an apparatus and a method that distributes interrupts in a computer architecture employing IA-32 processors.

BACKGROUND ART

Multiprocessor computers implement varying levels of symmetry. Master-slave processor computer systems are very asymmetric, whereas in computers designed with higher levels of symmetry, each of the working processors are capable of performing the same functions. In symmetric computers, the working processors share buses, address the same memory and basic input/output system (BIOS) resources, and receive the same array of interrupts.

New advances in computer architecture may be based on Intel® Architecture (IA)-64 technology by including IA-64 input/output. However, these IA-64 components cannot be used with the current IA-32 processors unless a mechanism is provided to bridge the differences between the IA-32 and IA-64 architectures.

SUMMARY OF INVENTION

A system for distributing interrupts includes a number of applications processors that are coupled together by an advanced programmable interrupt controller (APIC) bus and by a processor bus. One or more applications processors can be so coupled. Also coupled to the processor bus is a bridge. The applications processors are IA-32 components and the bridge translates between the IA-32 architecture of the applications processors and the architecture of the system.

The system may include any number of applications processors and bridge processors. The combination of these applications processors and one bridge forms a node. The nodes are coupled together by a system. Each applications processor has a unique address related to a nodeID of the bridge and a further processor ID.

To distribute interrupts, the system uses advanced features to assert, acknowledge and process the interrupts. Interrupts are forced transfers of execution from a currently running program or task to a special program called an interrupt handler. The applications processors can receive interrupts from other applications processors, or from external devices, such as a keyboard, for example. The sources of the interrupt, as well as the operating mode of the system (i.e., DOS or NT) determines some features of the interrupt handling.

In an embodiment, I/O controllers deliver interrupts to the system via interrupt transactions on the system bus. The bridge monitors the system bus and determines when a particular interrupt transaction is directed to an applications processor at the bridge's node. The bridge may accept the interrupt transaction and assert the interrupt pin on the appropriate applications processor. The interrupt pin on the applications processor may be programmed to produce external interrupts as per IA-32 processor specifications. When the applications processor is able to receive the interrupt, the applications processor will return an interrupt acknowledge on the processor bus. The bridge then provides an interrupt vector. With the interrupt vector, the applications processor is able to associate the appropriate interrupt handler.

The interrupt mechanism also incorporates advanced features of interrupt buffering, prioritizig and thresholding. The bridge will buffer interrupt signals for an applications processor that cannot currently accept an interrupt because, for example, the applications processor is currently processing a previous interrupt.

BRIEF DESCRIPTION OF DRAWINGS

The invention will be described with reference to the following drawings wherein like numerals refer to like objects, and wherein.

DISCLOSURE OF INVENTION, BEST MODE FOR CARRYING OUT INVENTION, INDUSTRIAL APPLICABILITY, AND DETAILED DESCRIPTION OF INVENTION

Multi-processor computer systems must have a mechanism for distributing interrupts. This mechanism may be more complicated when the multi-processor computer system uses components of different architectures, such as IA-32 and IA-64 architectures. The invention provides a mechanism for distributing interrupts to IA-32 processors in a mixed IA-32 and IA-64 architecture.

Interrupts are forced transfers of execution from a currently running program or task to a special program called an interrupt handler. Interrupts may occur at random times during the execution of a program, in response to signals from hardware, for example. These interrupts are used to handle events that occur external to a processor. An example is a keyboard key press. Interrupts may also be generated by software.

The processors in the computer system may include a mechanism that allows the interrupts to be handled in a manner that is transparent to the application program that is running on the processor. When an interrupt is received, the currently running application program is suspended while the processor executes an interrupt handling sequence. When execution of the interrupt is completed, the processor may return to execution of the suspended application program. The resumption of the interrupted application program happens without loss of application program continuity, unless the interrupt caused the application program to be terminated.

In a multi-processor environment, the computer system may route interrupts to a desired processor for execution.

This may require a mechanism for locating each of the processors, routing the interrupts, and in some cases buffering the interrupts and receiving interrupt acknowledge signals from the processors. The mechanism is complicated when components with different architectures are used in the same computer system.

Figure 1:
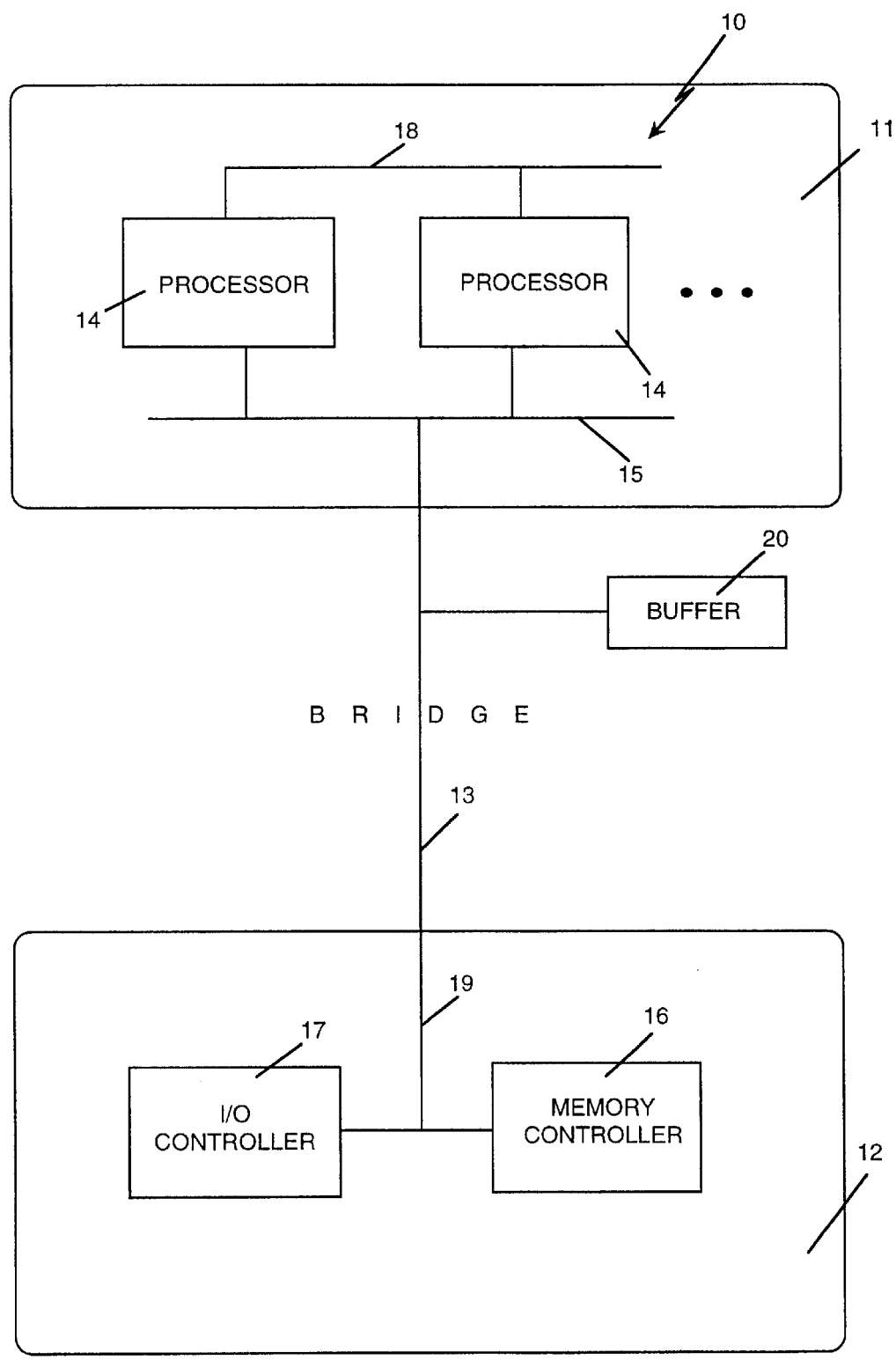
FIG. 1 is a block diagram of a computer architecture having IA-32 applications processors.

FIG. 1 shows a system 10 that may be used to distribute interrupts in a computer system. The system 10 includes an IA-32 processor system 11 coupled to system components 12 by a bridge 13. The IA-32 processor system 11 may include one or more processors 14 that perform various computing functions. The processors 14 are coupled to a common bus 15, and may be coupled to a local advanced programmable interrupt controller (APIC) bus 18. The processors 14 share access to the common bus 15, and may also share other resources such as memory, input/output (I/O) devices, and interrupt handlers, for example. The system components 12 provide enhanced functionality, and can be used with the existing IA-32 processors 14, provided that appropriate hardware and/or software is used to ensure compatibility between the IA-32 processor system 11 and the system components 12. For example, the system components 12 may include a system bus 19 coupled to a memory controller 16 and an I/O controller 17, all of which are designed for use with IA-64 processors. The resulting system 10 may require special mechanisms to distribute interrupts. The bridge 13 may be part of the interrupt delivery mechanism. The bridge 13 may include a buffer 20 for storing interrupts and a priority and threshold mechanism 21 for prioritizing interrupts. To ensure optimum performance, the bridge 13 may be implemented in VLSI, for example.

Figure 2:
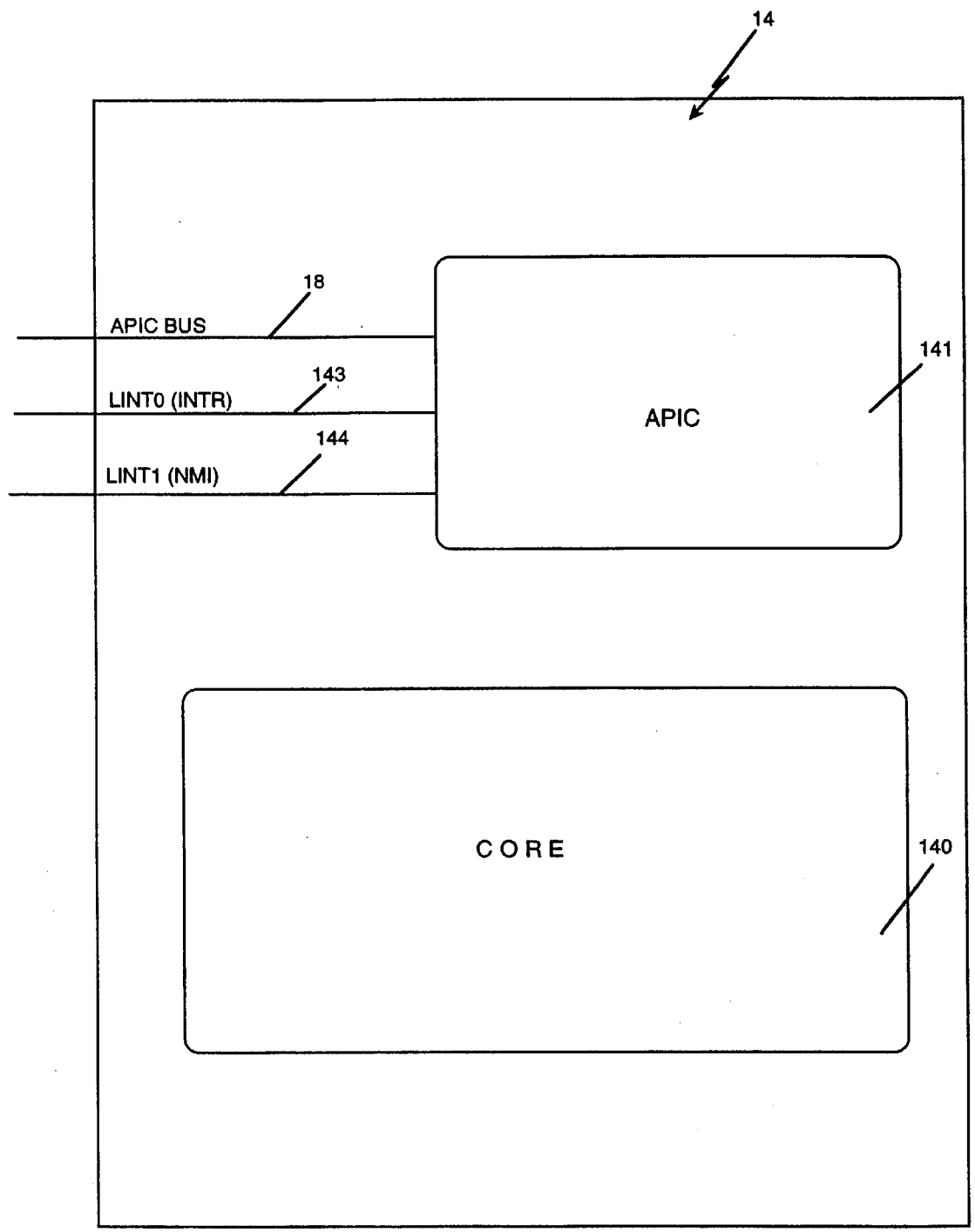
FIG. 2 is a block diagram of an IA-32 processor from the computer architecture of FIG. 1.

FIG. 2 is a block diagram of the IA-32 processor 14 used in the system 10 of FIG. 1. The processor 14 includes a core unit 140 that controls processing on the processor 14. An APIC 141 processes external and normal interrupts that the processor 14 may receive at its interrupt pins. The APIC 141 may be referred to as a local APIC. The local APIC processes interrupts received at its interrupt pins 143 and 144. The APIC also includes a connection to the APIC bus 18. The APIC bus 18 can be used to delivery interrupts to the application processors. The interrupt pins 143 and 144 may be programmed to receive specific types of interrupts.

Figure 3:
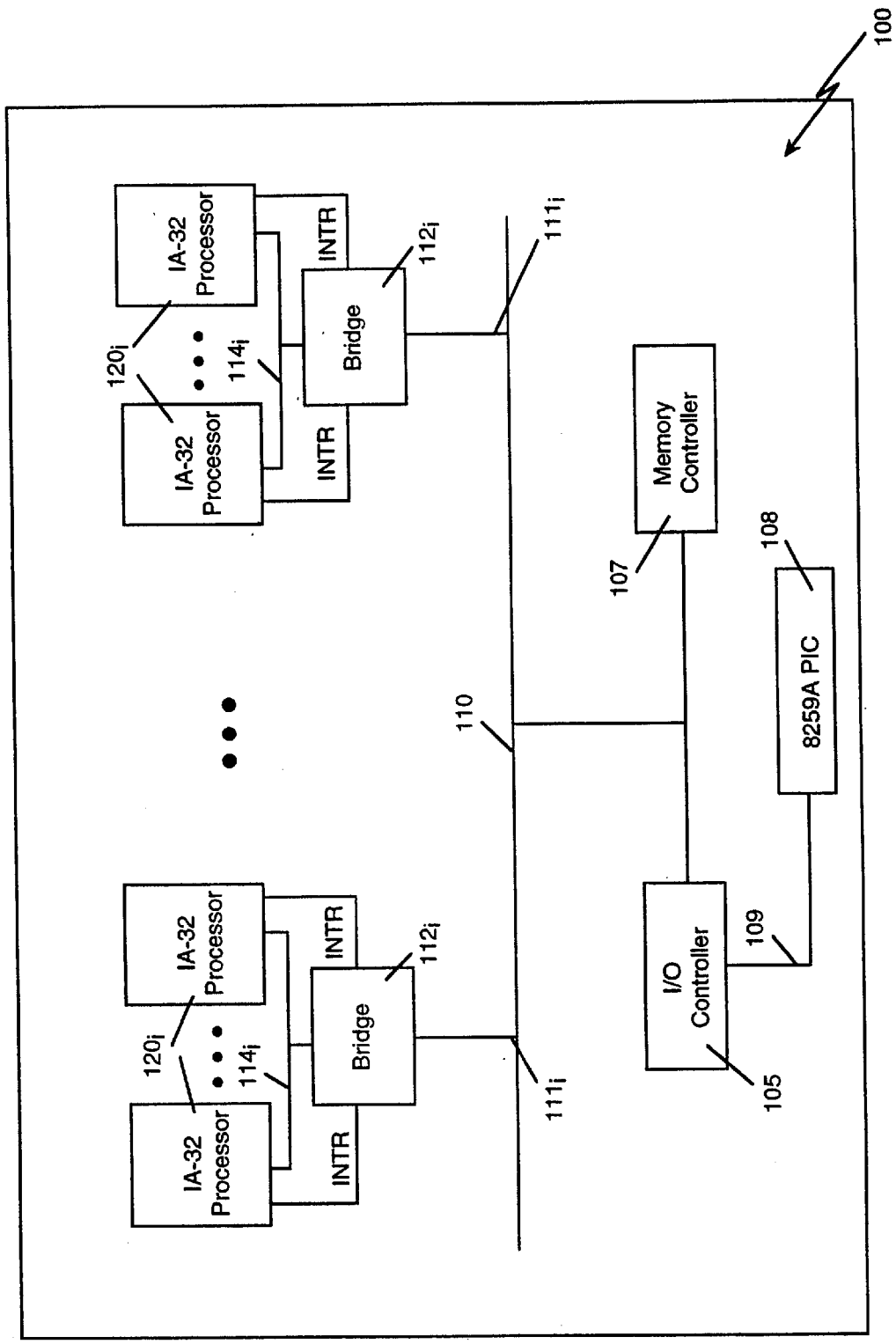
FIG. 3 illustrates a hybrid computer architecture in which a bridge couples IA-32 components and IA-64 components.

FIG. 3 shows an overall computer architecture 100 that includes IA-32 processors. System components include one or more I/O controllers 105, which are coupled to a memory controller 107. The I/O controllers 105 are coupled to I/O device buses 109. The buses 109 may include a peripheral computer interface (PCI) bus, for example. The buses 109 may connect standard computer peripherals such as a keyboard, for example. The buses 109 may also be used to signal external interrupts from external devices. The external interrupts may be delivered by a standard programmable interrupt controller (PIC) 108 such as an Intel® 8259A PIC, for example.

A system bus 110 connects the memory controller 107 and other components to IA-32 processors 120, via bridges 112$_i$, and processor buses 114$_i$. The IA-32 processors 120$_i$, and the bridges 112$_i$ are grouped at nodes 111$_i$. In FIG. 3, one ore more IA-32 processors 120$_i$ are shown connected at each of the nodes 111$_i$.

The bridge 112$_i$ takes the interrupts that are being delivered over the system bus 110 and signals the interrupt to the appropriate IA-32 processor 120$_i$. To ensure that a particular interrupt reaches the appropriate IA-32 processor 120$_i$, all interrupt transactions on the system bus 110 contain target node 111$_i$ and IA-32 processor 120$_i$ identification. Each bridge 112$_i$ monitors the system bus 110 to determine if an interrupt transaction on the system bus 110 is addressed to one of the IA-32 processors 120$_i$ on the bridge's node 111$_i$. That is, when an interrupt transaction is presented on the system bus 110, each of the bridges 112$_i$ examines a destination ID field in the interrupt transaction. This field contains a nodeID and a processor ID. The bridge 112$_i$ whose nodeID matches the nodeID field of the interrupt transaction will recognize and deliver the interrupt.

Software may initialize the I/O controllers 105 to transfer an interrupt transaction in a manner that identifies the IA-32 processor 120$_i$ to be interrupted. The bridge 112$_i$ that is connected to the same processor bus 114$_i$ as the destination IA-32 processor 120$_i$ recognizes the interrupt transaction, and asserts an interrupt pin at the targeted IA-32 processor 120$_i$. Since more than one interrupt could be delivered to a node, the bridge 112$_i$ may buffer, prioritize, or throttle the interrupt transactions.

Interrupt transactions on the system bus 110 contain target node and processor identification and may contain either the interrupt vector (for a normal interrupt), an indication that the interrupt is an external interrupt, or an indication that the interrupt is a non-maskable interrupt (NMI). If the interrupt is a normal interrupt, the interrupt vector is supplied with the interrupt transaction. If the interrupts is a NMI, then the interrupt vector is implied. If the interrupt is an external interrupt, the interrupt vector is not supplied. Upon receiving an interrupt transaction for an external interrupt, the target IA-32 processor 120$_i$ generates an interrupt acknowledge transaction requesting the interrupt vector. The bridge 112$_i$ forwards the interrupt acknowledge transaction to the system bus 110, which will then supply the interrupt vector, allowing the interrupt handler in the IA-32 processor 120$_i$ to be executed.

Interrupts may originate from a pair of cascaded 8259A PICs, for example. In this configuration, the interrupts may be delivered as external interrupt transactions. The IA-32 processor 120$_i$ produces an interrupt acknowledge transaction to obtain the vector from the 8259A PIC. In an alternative method, the targeted bridge 112$_i$ could recognize that the interrupt transaction is for an 8259-type interrupt, directly issue the interrupt acknowledge and obtain the interrupt vector prior to asserting the interrupt. In this way, the interrupt sequence on the IA-32 bus 114$_i$ is identical regardless of the type of interrupt, because the bridge 112$_i$ will always already have the interrupt vector.

Alternatively, the targeted bridge 112$_i$ could "remember" that the interrupt transaction was an 8259-type interrupt, and when the targeted IA-32 processor 120$_i$ subsequently issues an interrupt acknowledge, the bridge 112$_i$ forwards the interrupt acknowledge transaction onto the system bus 110, and returns the resulting interrupt vector to the IA-32 processor 120$_i$ over the IA-32 bus 114$_i$.

In the computer architecture 100 shown in FIG. 3, I/O devices may deliver interrupts as transactions on the system bus 110. If an IA-64 architecture is used, interrupts may be delivered with a particular type of transaction on the system bus 110. In a mixed IA-32 and IA-64 architecture, one way to distribute interrupts between the nodes 111$_i$ is to use the above-described interrupt mechanism, adapted to be used with the IA-32 processors. For example, to send an interrupt from an I/O device, which is not on a node, but instead is somewhere off in the system 100, to a IA-32 processor 120$_i$, the interrupt may appear as an interrupt transaction on the system bus 110. The interrupt mechanism and interrupt architecture will ensure that the interrupt is delivered to the appropriate IA-32 processor $120_i$.

The interrupt handler may be software that resides in the a memory of the IA-32 processor $120_i$. The software is executed by the IA-32 processor $120_i$ like any other subroutine except the interrupt handler is invoked through an interrupt mechanism rather than a branch jump or a call.

Interrupt Handling

As discussed above, in the computer architecture 100, the IA-32 processors $120_i$ may be interrupted by asserting signals connected to the IA-32 processors $120_i$ directly. The interrupt delivery mechanism includes a code that allows the bridge $112_i$ to turn an interrupt transaction into an assertion of a particular signal to the target IA-32 processor $120_i$. For an external interrupt, the IA-32 processor $120_i$ responds by asking for the interrupt vector, a number that indicates which interrupt is being asserted. The bridge $112_i$ will in turn supply that interrupt vector to the IA-32 processor $120_i$.

Figure 4:
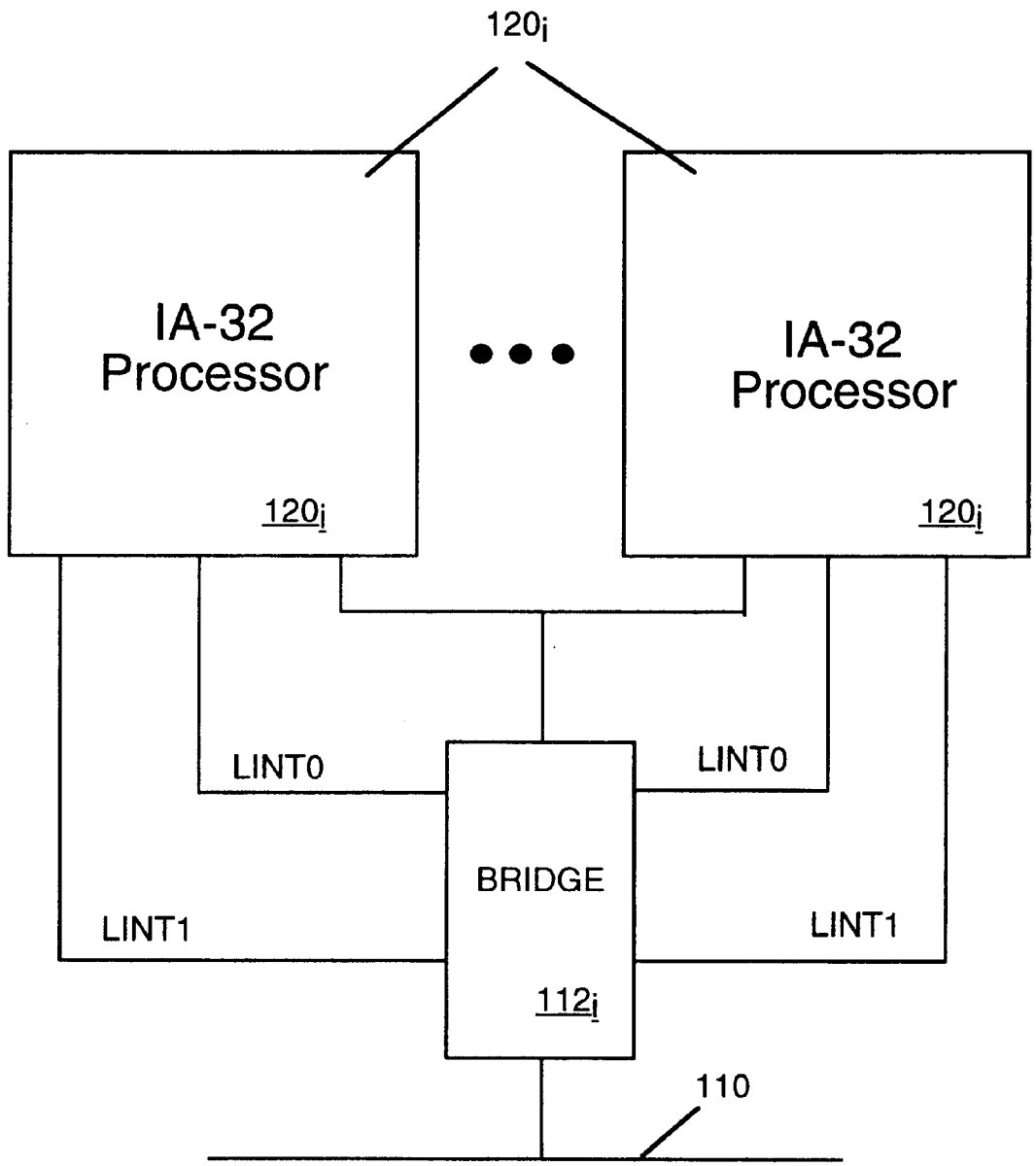
FIG. 4 is a block diagram of the interrupt architecture of FIG. 3.

FIG. 4 is another diagram of the interrupt mechanism. In FIG. 4, The system bus 110 routes an interrupt transaction to the bridge $112_i$. The bridge $112_i$ may assert the interrupt transaction as an interrupt signal using a LINT0# line or a LINT1# line. The definition of LINT0# and LINT1# interrupt pins is programmable. However, one of the LINT* lines may be dedicated to a NMI. The other LINT# line could be configured to deliver a fixed interrupt (an interrupt with a specific vector). Because there could be more interrupt sources than can be supported in this manner, a pin may be programmed to be an external interrupt pin. In this alternative, the IA-32 processor $120_i$ may issue an interrupt acknowledge transaction to obtain the interrupt vector.

Interrupt Priority and Threshold Mechanism

Figure 5:
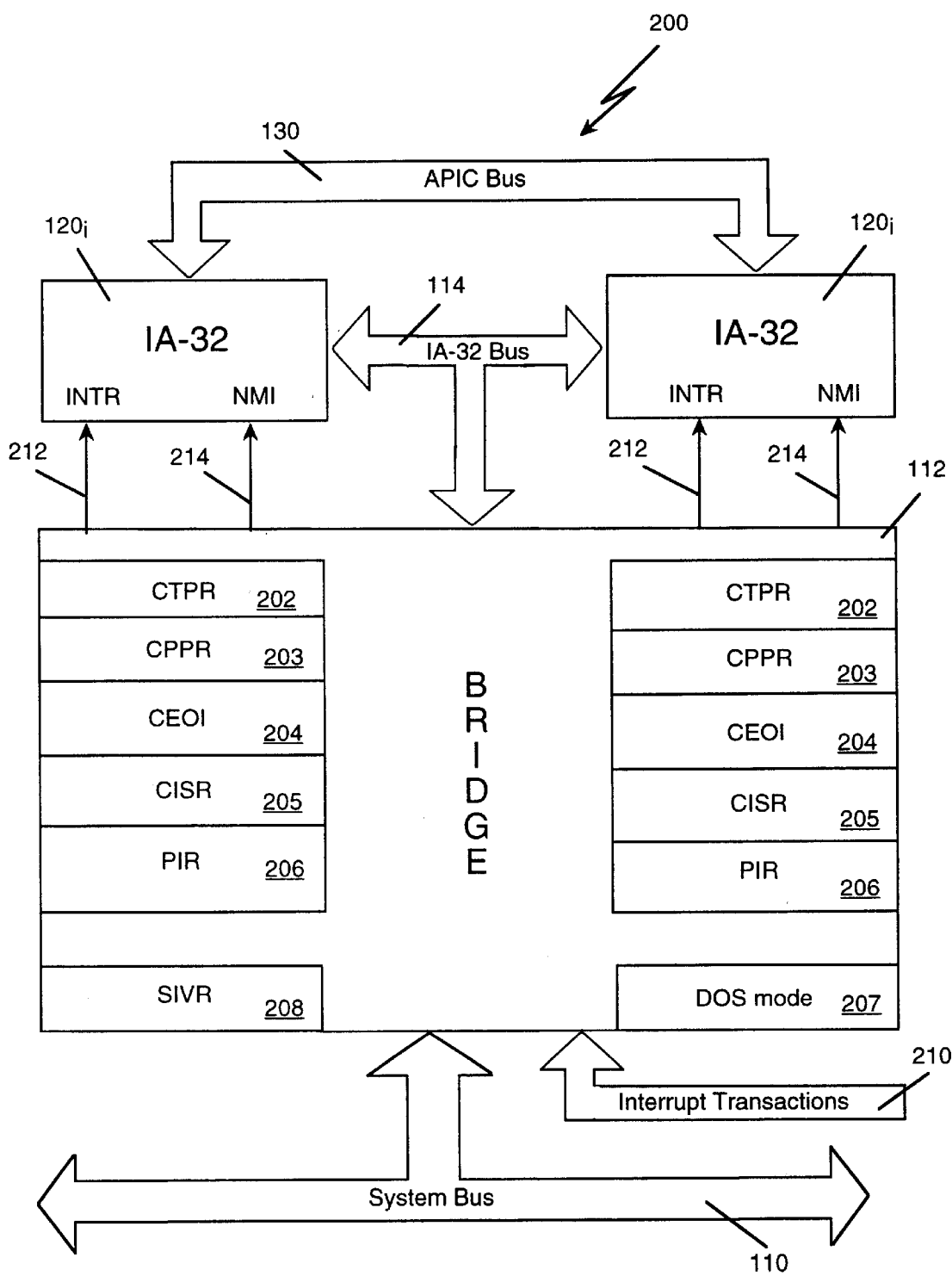
FIG. 5 is a block diagram of an interrupt priority and threshold mechanism.

FIG. 5 shows the interrupt priority and threshold mechanism 200 for the bridge $112_i$. The bridge $112_i$ routes all interrupts to each processor $120_i$. The bridge $112_i$ is shown with interrupt registers 202–208.

When an interrupt is recognized on the system bus 110, the bridge $112_i$ may buffer the interrupt, instead of the interrupt going straight to the processor. This is because when the bridge $112_i$ asserts an interrupt signal to the IA-32 processor $120_i$, the IA-32 processor $120_i$ may respond at a time in the future by requesting the interrupt vector. In the meantime, another interrupt could come in from the system bus 110 before the IA-32 processor $120_i$ actually requested its interrupt vector. As a result, the bridge $112_i$ may have to buffer up interrupt transactions occurring in that interval. Therefore, the bridge $112_i$ includes a buffer that stores the interrupt vectors. The buffer may be included in a Pending Interrupt Register 206. As a result, the IA-32 processor $120_i$ could have more than one pending interrupt. There are up to 256 interrupts defined for an IA-32 processor $120_i$.

When an interrupt transaction is presented on the system bus 110, each of the bridges $112_i$ examines a destination ID field included with the interrupt transaction. This field contains a nodeID and a processor ID. The bridge $112_i$ whose nodeID matches the nodeID field in the interrupt transaction will recognize and deliver the interrupt.

Once the bridge $112_i$ has determined that it is the target of an interrupt transaction, the bridge $112_i$ examines the processor ID field to determine which IA-32 processor $120_i$ is the target of the interrupt. Several different actions are possible at this point depending on the type of the interrupt.

If the interrupt is a non-maskable interrupt (NMI), then the NMI input to the target processor is asserted and deasserted at one of the LINT* pins according to IA-32 processor timing requirements. When generating the NMI to a IA-32 processor $120_i$, Intel® defines an assertion time (for the NMI input) followed by a de-assertion time. If the NMI is targeted at a IA-32 processor $120_i$ while the bridge $112_i$ is currently in the process of generating a second NMI (and meeting the Intel® timing specification) to that IA-32 processor $120_i$, the second NMI can be discarded. There does not need to be an external bit identifying this situation. The redundant NMIs can be discarded rather than being delayed because of the way NMI's are handled in software.

If the interrupt transaction 210 specifies an external interrupt, the bridge $112_i$ sets a Pending External Interrupt bit in an In Service Register (CISR) 205. The next Interrupt Acknowledge (INTA) transaction received by the bridge $112_i$ from the targeted IA-32 processor $120_i$ is forwarded to the system bus 110 allowing interrupt controllers to respond with the interrupt vector. If DOS mode is enabled (and the NT, or server mode is disabled), the external interrupts may not use the interrupt priority thresholding mechanism in order to be compatible with DOS. If the DOS mode is disabled, the interrupt vector returned by the interrupt controller is treated as a normal interrupt vector and processed through the priority and threshold mechanism 200 for the target IA-32 processor $120_i$.

If the interrupt is a normal (vectored) interrupt, the interrupt contains the interrupt vector which is passed to the priority and threshold mechanism 200 for the target IA-32 processor $120_i$.

The priority mechanism for each IA-32 processor $120_i$ is an enhancement over that of the local APIC. A Task Priority Register (CTPR) 202 allows the OS (e.g., software) to regulate the level of interrupts that may be dispatched to the IA-32 processor $120_i$. The priority level of an interrupt is determined by using the value of the most significant nibble of the interrupt vector with 0xF having the highest priority and 0x1 having the lowest priority. Interrupt vectors 0x00 through 0x0F are reserved when DOS mode is disabled implying that priority level 0 can never occur while the priority and threshold mechanism 200 is in use. (The vectors 0x00 through 0x0F are assigned to processor exceptions.) Only interrupts that have a higher priority than the priority programmed in the CTPR 202 have the potential of being dispatched to the IA-32 processor $120_i$.

A Processor Priority Register (CPPR) 203 defines the highest priority (normal) interrupt previously dispatched to the IA-32 processor $120_i$. An IA-32 processor $120_i$ can only be dispatched an interrupt if the interrupt priority is greater than the value in the CPPR 203. The CPPR 203 is set at a value greater than or equal to the value in the CTPR 202. When software writes a higher value to the CTPR 202 than previously stored, the bridge $112_i$ adjusts the value in the CPPR 203 so that its value equals that in the CTPR 202. When the CTPR 202 and the CPPR 203 have the same value, then no (vectored) interrupts are dispatched to the IA-32 processor $120_i$ above the programmed threshold specified in the CTPR 202. An End of Interrupt (CEOI) register 204 is used by software to indicate when the highest priority interrupt previously dispatched has been serviced. The bridge $112_i$ uses the writing of the CEOI register 204 to update the priority threshold mechanism registers and potentially assert another interrupt to the IA-32 processor $120_i$ that generated the CEOI write transaction. The actions of the CEOI register 204 are the same as the local APIC with the exception that no EOI message is sent for level sensitive interrupts. Software writes to the appropriate EOI register when the CISR 205 has finished servicing the interrupt.

Normal interrupts are prioritized by the Pending Interrupt Register (PIR) 206. The PIR 206 is a register that identifies which (normal) interrupts are waiting to be dispatched to the IA-32 processor $120_i$. The CISR 205 identifies which normal interrupts have been sent to the IA-32 processor $120_i$. When the bridge $112_i$ sends a pending interrupt to the IA-32 processor $120_i$, the corresponding interrupt vector is reset in the PIR 206 and the same vector is setup in the CISR 205. Only one external interrupt can be generated by the cascaded 8259A PICs at a time. Thus, the CISR 205 has a mechanism to identify when a pending external interrupt exists. This bit is referred to as the Pending External Interrupt (PEI). When the PEI indicates that an external interrupt exists, the next interrupt acknowledge received from the targeted IA-32 processor $120_i$ is forwarded to the system bus 110 to obtain the interrupt vector. To avoid a race condition, the PEI must be reset, indicating that an external interrupt is not pending, prior to forwarding the interrupt acknowledge to the system bus 110.

A set of the above registers 202–206 is supplied for each of the IA-32 processors $120_i$ handled by the bridge $112_i$. Each set 202–206 is mutually exclusive and drives one of the local LINT* lines to an IA-32 processor $120_i$. Interrupt connections 212 and 214 from the bridge $112_i$ to the IA-32 processors $120_i$ may be identified as INTR and NMI.

Once the conditions are met for the bridge $112_i$ to interrupt an IA-32 processor $120_i$, the bridge $112_i$ asserts the INTR line until the IA-32 processor $120_i$ generates an interrupt acknowledge (INTA) transaction. The INTR remains asserted until an INTA transaction is received to guarantee that the interrupt will be detected by the IA-32 processor $120_i$.

After asserting the INTR, the IA-32 processor $120_i$ (eventually) generates an INTA transaction to gain access to the interrupt vector. The bridge $112_i$ responds to the INTA transaction with the vector of the highest priority pending interrupt at a time after the INTA transaction was received and after all system bus transactions are complete that were pending prior to the original interrupt transaction on the system bus 110. An interrupt can be sent to the IA-32 processor $120_i$ any time after which an interrupt becomes available for delivery (i.e., the interrupt passes any applicable threshold requirements) and the bridge $112_i$ is not already delivering an interrupt. Due to the asynchronous nature of the process, the actual interrupt vector may not be determined until the IA-32 processor $120_i$ actually generates the INTA transaction. Higher priority interrupts may arrive in the interim between assertion of the INTR and return of the INTA transaction. Furthermore, in the interim, a task priority register (TPR) write may occur that masks the (normal) interrupt that caused the INTR to be asserted. This may result in the bridge $112_i$ returning a "spurious vector," which will be described in more detail later.

The following defines the algorithm (in priority order) for vector delivery in response to an INTA transaction from a IA-32 processor $120_i$:

1. The pending external interrupt if in DOS mode.
2. The pending internal interrupt (or external interrupt if DOS mode is disabled) with the highest priority that is above the priority defined in the CPPR 203. If more than one interrupt exists with the same priority, then the interrupt with the largest vector value will be selected.
3. Since the value of the CPPR 203 can be changed at any time (e.g., as a result of a CTPR 202 write), there might not be an interrupt with a priority larger than the priority defined by the CPPR 203. In that case, the bridge $112_i$ returns the interrupt vector from a Spurious Interrupt Vector Register (SIVR) 208.

To support inter-processing interrupts, interrupts generated by software to interrupt another IA-32 processor $120_i$, the bridge $112_i$ responds to write transactions to a reserved memory address range on the processor bus $114_i$ by issuing interrupt transactions on the system bus 110. The write transaction would identify the targeted IA-32 processor $120_i$ to be interrupted and the type of interrupt.

Interrupt Transaction Processing

The bridge $112_i$ snoops the interrupts transactions 210 in order to access those directed to the IA-32 processors $120_i$ in the same node as the bridge $112_i$. The system bus 110 may be able to support several different types of interrupt transactions. However, the bridge $112_i$ may accept and process the types of interrupt transactions defined in Table A. The bridge $112_i$ may ignore other interrupt transaction types.

TABLE A

Processed Interrupt Transactions

| Transaction Type | General Processing |
| --- | --- |
| NMI | Generate an NMI to the targeted processor. |
| Normal INT | Process the supplied interrupt vector through the priority threshing mechanism. |
| External INT | Generate an interrupt to the processor and allow the corresponding interrupt acknowledge transaction to be forwarded to the System bus. |

DMA and Interrupt Synchronization

An interrupt handler may assume that the occurrence of the interrupt implies that the associated DMA is complete, while, in reality, the data available to the processor is stale. Interrupt handlers for PCI devices do not have this problem since the PCI specification requires the ISR to perform a read on the interrupting device which forces all pending DMA transfers to be completed. Interrupt handlers for other peripheral buses (e.g., ISA buses) do not require any special action to be performed by the handler to force pending DMA transfers to complete prior to acting on the interrupt.

To avoid this situation, the bridge $112_i$ guarantees that system bus transactions are complete that were pending prior to the original interrupt transaction on the system.

The above solution to the ISA DMA problem in the bridge $112_i$ has an implication for the interrupt forwarding algorithm. To insure the dependencies are correctly resolved, the bridge $112_i$ selects the highest priority interrupt from all interrupts that have had all pending coherency traffic flushed that were pending at the time the original interrupt transaction 210 was received.

Interrupt Handling Details

Figure 6:
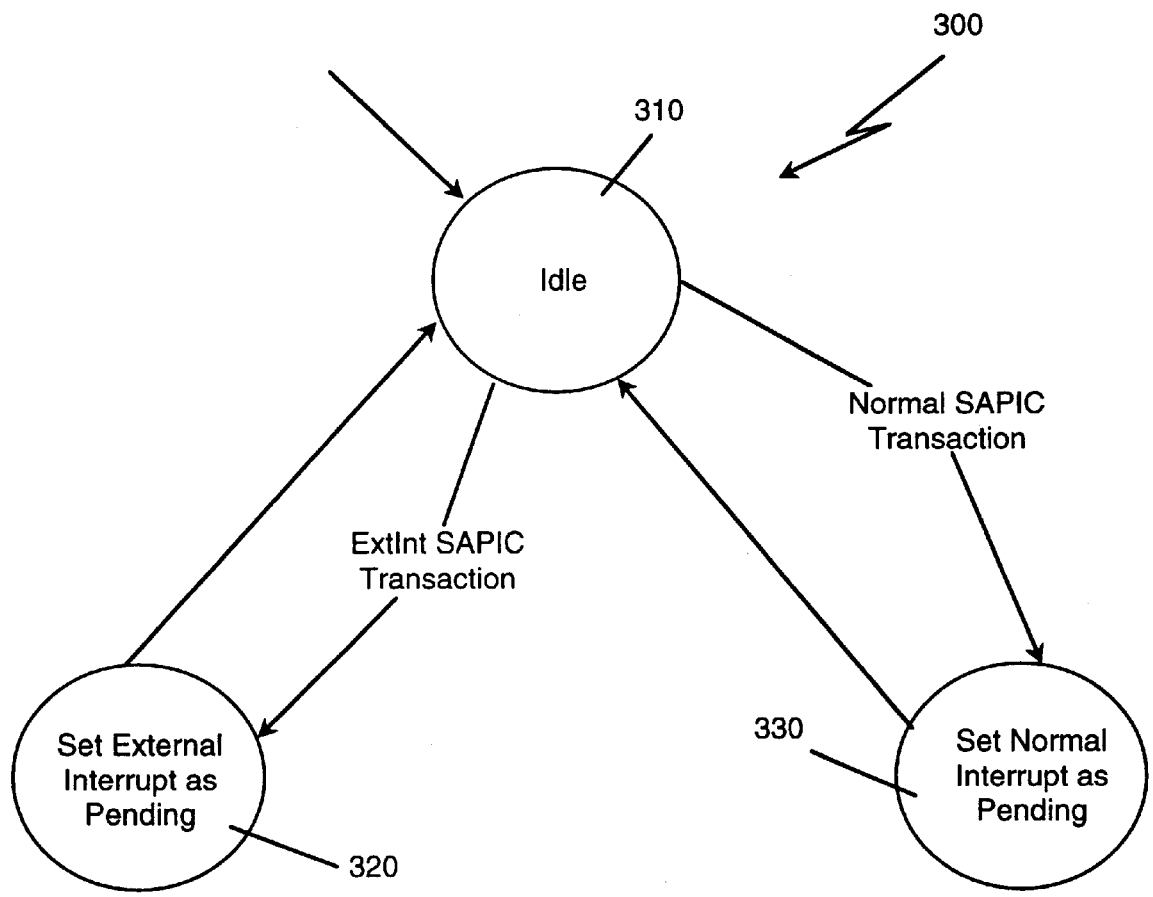
FIG. 6 illustrates an interrupt handling state machine for a system bus.

FIG. 6 is a system bus state machine 300 that illustrates the interrupt handling algorithms for the bridge $112_i$ in the system bus domain. A separate collection of interrupt delivery state machines is dedicated to each IA-32 processor $120_i$ controlled by the bridge $112_i$. The discussion that follows describes the set of state machines for a single IA-32 processor $120_i$.

As noted above, normal interrupts represent interrupt transactions 210 that deliver the interrupt vector in the transaction. External interrupts are interrupt transactions 210 that do not transmit the interrupt vector in the transaction and therefore require interrupt acknowledge transactions on the system bus 110 to gain access to the interrupt vector. NMI interrupts do not require such complex mechanisms since they are directly delivered to the target IA-32 processor $120_i$, are not prioritized or thresholded, and have no dependencies.

As shown in FIG. 6, the state machine 300 can exist in one of three states: an Idle State 310, a Set External Interrupt as Pending State 320, and a Set Normal Interrupt as Pending State 330. The only event that causes the state machine 300 to transition from the Idle State 310 is the reception of a normal or external interrupt transaction. The bridge $112_i$ may receive external interrupts as internupt transactions 210 (see FIG. 5). The external interrupts may be from a single source, such as the 8259A PIC, for example. Since the external interrupts may be generated from only one 8259 in the computer architecture 100 of FIG. 3, only one interrupt can be in the process of being delivered across the system bus 110 at a time by the 8259A PIC. The state machine 300 shown in FIG. 6 relies on this condition. When an external interrupt is received while in the Idle State 310, the bridge 112 transitions to the Set External Interrupt as Pending State 320.

In the Set External Interrupt as Pending State 320, the bridge $112_i$ sets bit PEI. Once the interrupt is marked as pending, the state machine 300 transitions back to the Idle State 310 allowing the pending interrupt to be handled. For each bridge $112_i$, no more than one external interrupt is pending delivery at a time.

The reception of a normal interrupt causes the state machine 300 to transition to the Set Normal Interrupt as Pending State 330. In the Set Normal Interrupt as Pending State 330, the bridge $112_i$ may extract the interrupt vector from the interrupt transaction 210 and set the appropriate PEI in the PIR 206 to mark the interrupt as pending. If the PEI was already set, then an interrupt for that interrupt vector is already pending and the current interrupt is discarded. This allows the computer architecture 100 to have one pending, non-dispatched normal interrupt per interrupt vector. The CISRs handle the condition that several interrupts may have occurred since last executed.

Figure 7:
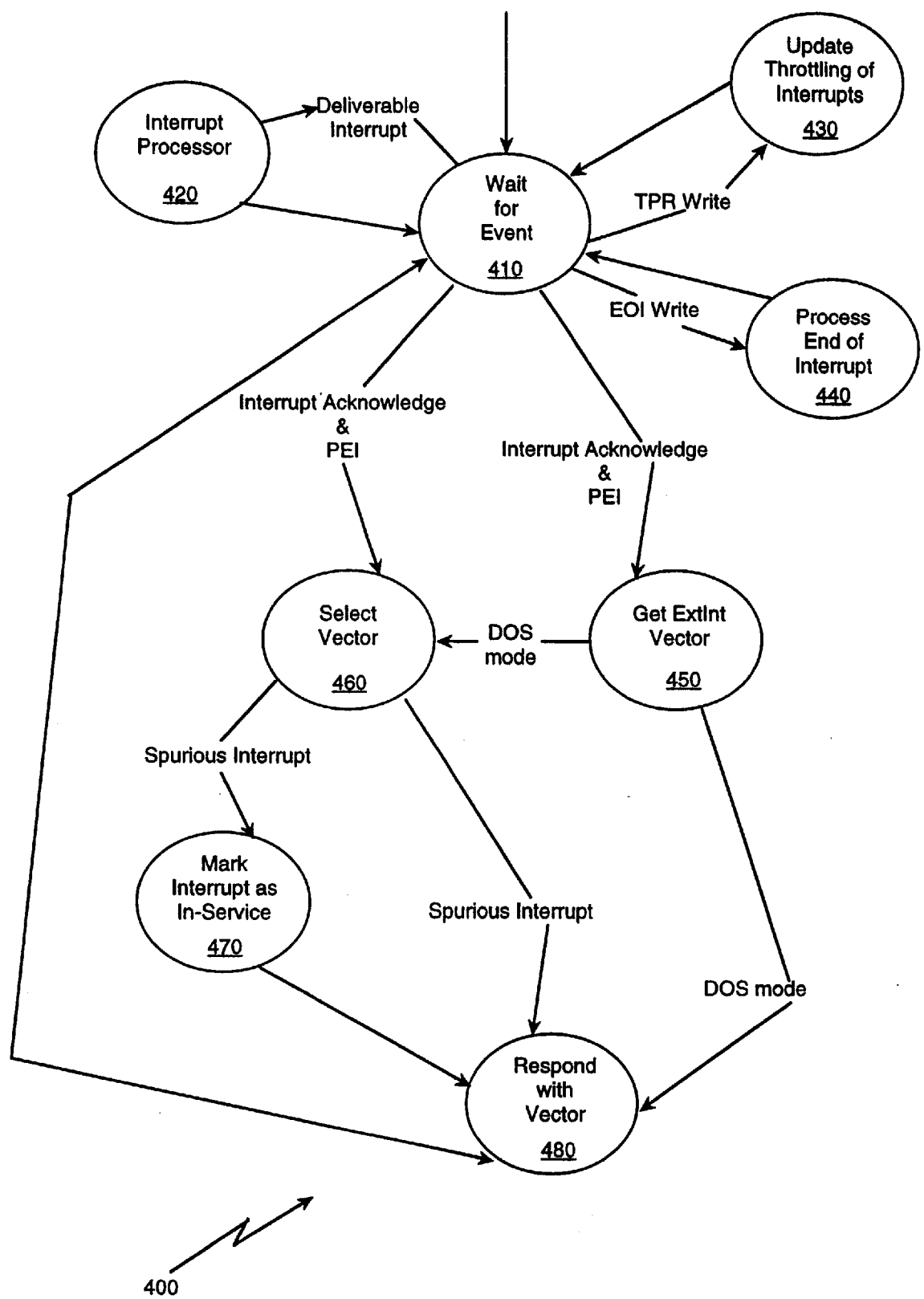
FIG. 7 illustrates an interrupt handling state machine for an IA-32 processor bus.

FIG. 7 shows an IA-32 state machine 400 that includes the following states: a Wait for Event State 410; an Interrupt Processor State 420; an Update Throttling of Interrupts State 430; a Process the End of Interrupt State 440; a Get ExtInt Vector State 450; a Select Vector State 460; a Mark Interrupt as In-Service State 470; and a Respond with Vector State 480. The IA-32 state machine 400 may wait until it is able to deliver an interrupt from the Wait for Event State 410. This condition may be met when INTR is not asserted (and has met the minimum deassertion timing) and either there is a pending external interrupt (PEI is set) or a pending normal interrupt with a priority greater than the priority of the highest interrupt sent to the IA-32 processor $120_i$ (highest priority in the PIR 206 is greater than the value in the CPPR 203).

If the bridge $112_i$ is able to deliver an interrupt, a transition is made to the Interrupt Processor State 420. In the Interrupt Processor State 420, INTR is asserted. After asserting INTR, the IA-32 state machine 400 returns to the Wait for Event State 410.

The IA-32 state machine 400 cannot determine the amount of time it will take the IA-32 processor $120_i$ to generate the interrupt acknowledge in response to asserting INTR. The INTR remains asserted until the bridge $112_i$ receives an interrupt acknowledge from the IA-32 processor $120_i$ that was interrupted.

An interrupt acknowledge is defined as an IA-32 interrupt acknowledge transaction. In this condition, the bridge $112_i$ responds to all IA-32 interrupt acknowledge transactions with a vector. If the IA-32 state machine 400 is in the Wait for Event State 410 and an interrupt acknowledge occurs, the IA-32 state machine 400 transitions to the Get ExtInt Vector State 440 if there is a PEI. Otherwise, the IA-32 state machine 400 transitions to the Select Vector State 460. The Get ExtInt Vector State 450 is described in more detail later.

When the IA-32 processor $120_i$ acknowledges the interrupt, the Select Vector State 460 de-asserts INTR to the IA-32 processor $120_i$. This is the earliest time that INTR can be de-asserted. the Select Vector State 460 also determines the highest priority interrupt to send to the IA-32 processor $120_i$ at the time the Select Vector State 460 is entered, and not when INTR was asserted. The type of interrupt selected is based on the following order:

1. Pending normal interrupt. The pending normal interrupt that has a priority greater than the CPPR 203. If the highest priority pending interrupt in the PIR 206 is greater than the value in the CPPR 203, the bridge $112_i$ responds with the vector associated with the highest priority pending normal interrupt.
2. Spurious interrupt condition. From the time the bridge $112_i$ asserts INTR to the time the bridge $112_i$ receives an interrupt acknowledge, the OS could write to the CPPR 203. If this change causes all pending normal interrupts to have a priority less than or equal to the CPPR 203 at the time the interrupt acknowledge is received by the bridge $112_i$, then there is no interrupt for the IA-32 processor $120_i$. There is also the potential of receiving an interrupt acknowledge when there are no pending interrupts. The bridge $112_i$ responds to all interrupt acknowledges. Therefore, if there are no pending external interrupts, or pending normal interrupts that have a priority greater than the CPPR 203, the bridge $112_i$ responds with the spurious vector as defined by the SWR 208.

If a normal interrupt is selected, then the interrupt is moved from the pending to the in-service condition prior to responding with the vector (Mark Interrupt as In-Service State 470). This is done by resetting the corresponding bit in the PIR 206 and marking the vector in the CISR 205. The CPPR 203 is updated with the priority of the normal interrupt selected. The IA-32 state machine 400 transitions to the Respond with Vector State 480 after updating the PIR 206, the CISR 205 and the CPPR 203. In the Respond with Vector State 480, the bridge $112_i$ responds to the interrupt acknowledge with the selected vector. The response consists of deferring the interrupt acknowledge, guaranteeing that all pending invalidate transactions are flushed, and then generating the deferred response to the interrupt acknowledge. This completes the process of sending a normal interrupt via an interrupt transaction 210.

After a IA-32 processor $120_i$ receives a normal interrupt, but before the end of the In-Service Register (ISR) routine, software may issue an end of interrupt to the IA-32 state machine 400 (process the End of Interrupt State 440) to allow the IA-32 state machine 400 to retire the delivered normal interrupt. The ISR can issue the end of interrupt early in the handling of the ISR to allow for interrupts of the same priority to be dispatched. Software signals the end of interrupt by writing to the CEOI 204. The same process exists for the local APIC. The external interface provides a service to write the end of interrupt to the local APIC.

A write to the CEOI 204 may retire the highest priority interrupt dispatched to the IA-32 processor $120_i$. This means that the bit associated with the highest priority interrupt in the CISR 205 is reset. Since the highest priority interrupt dispatched to the IA-32 processor 120 has completed, the CPPR 203 is updated to the greater of the highest priority interrupt in the CISR 205 or the priority in the CTPR 201. If the CEOI 204 write is performed while there are no dispatched interrupts, the write is ignored. Once the CISR 205 and the CPPR 203 are updated, the IA-32 state machine 400 transitions back to the Wait for Events State 410.

Handling of an external interrupt on the IA-32 side is the same as handling a normal interrupt with the exception of the Get ExtInt Vector State 450. Once the INTR is asserted and an interrupt acknowledge is received, and an external interrupt is pending (PEI is set), a transition is made from the Wait for Event State 410 to the Get ExtInt Vector State 450. Upon entering the Get ExtInt Vector State 450, the PEI is reset and then the interrupt acknowledge is transferred to the system bus 110 to allow the 8259A PIC to respond with the actual interrupt vector. The ordering of resetting the PEI and then generating an interrupt acknowledge transaction may be maintained to avoid the 8259 race condition described earlier. Once the 8259A PIC responds with the external interrupt vector, the IA-32 state machine 400 transitions to the Select Vector State 460 or the Respond with Vector State 480, based on the DOS mode.

If the DOS mode is enabled, the IA-32 state machine 400 transitions to the Respond with Vector State 480. If the DOS mode is disabled (and NT enabled), then the external interrupt vector is passed to the Select Vector State 460 to be processed as a normal vectored interrupt.

The local APIC allows the OS to throttle normal interrupts by writing a priority to the CTPR 202. Normal interrupts that have a priority equal to or less than the priority defined by the CTPR 202 may not be dispatched to the IA-32 processor 120$_i$. The Update Throttling of Interrupt State 430 in the IA-32 state machine 400 represents the writing of the CTPR 202 by the IA-32 processor 120$_i$. A transition is made from the Wait for Event State 410 to the Update Throttling of Interrupt State 430 when a IA-32 transaction writes to the CTPR 202. The bridge 112$_i$ updates the CTPR 202 to the specified value. Then, if the CPPR 203 is less than the CTPR 202, the CPPR 203 may be sent to the same value as the CTPR 202.

What is claimed is:

1. An apparatus for distributing interrupts in a computer system, comprising:
    a system bus that employs interrupt transactions; and
    a plurality of nodes coupled to the system bus, a node, comprising:
        a bridge, wherein the bridge monitors transactions on the system bus, and
        a plurality of IA-32 processors coupled to the bridge, wherein the bridge converts interrupt transactions on the system bus to interrupt signals and asserts the interrupt signals to an identified IA-32 processor.

2. The apparatus of claim 1, wherein each node of the plurality of nodes includes a unique node identification and each IA-32 processor of the plurality of IA-32 processors includes a unique processor identification, and wherein an interrupt transaction on the system bus includes the unique node identification and the processor identification.

3. The apparatus of claim 1, wherein each IA-32 processor, comprises:
    a first interrupt pin; and
    a second interrupt pin, wherein the first and the second interrupt pins are programmable.

4. The apparatus of claim 1, wherein the bridge, comprises:
    a priority and threshold mechanism that controls distribution of interrupts to IA-32 processors coupled to the bridge; and
    a buffer that stores interrupt transactions for assertion to the IA-32 processors coupled to the bridge.

5. The apparatus of claim 1, further comprising:
    a processor bus coupled to the bridge and the plurality of IA-32 processors;
    an input/output (I/O) controller coupled to the system bus; and
    a memory controller coupled to the system bus, wherein the I/O controller delivers interrupts to the system bus as interrupt transactions.

6. The apparatus of claim 1, wherein the computer system operates in a disk operating system (DOS) mode, the computer system including an external programmable interrupt controller (PIC), the external PIC supplying an external interrupt, and wherein the external interrupt is asserted by the bridge and an external interrupt vector is provided by the external PIC.

7. The apparatus of claim 2, wherein the bridge identifies an IA-32 processor as a target IA-32 processor to receive an interrupt based on the unique node identification and the unique processor identification included in the interrupt transaction.

8. The apparatus of claim 3, wherein at least one of the first and the second interrupt pins is programmed to receive one of a non-maskable interrupt and an external interrupt.

9. The apparatus of claim 4, wherein the priority and threshold mechanism, comprises:
    a programmable task priority register, wherein the task priority register may be set to prevent delivery of interrupts having a lower priority that a value programmed into the task priority register; and
    a processor priority register that records a priority value of a first interrupt sent to an IA-32 processor, wherein a second interrupt may be asserted at the IA-32 processor when an interrupt priority of the second interrupt is greater than the priority value of the first interrupt.

10. The apparatus of claim 4, wherein the priority and threshold mechanism, comprises:
    a pending interrupt register, the pending interrupt register comprising a plurality of bits corresponding to a plurality of possible interrupt vectors, wherein a bit identifies a normal interrupt that may be asserted at an IA-32 processor.

11. The apparatus of claim 5, wherein the memory controller, the I/O controller and the system bus are IA-64 architecture.

12. The apparatus of claim 5, wherein the IA-32 processors generate inter-processors interrupts, and wherein the inter-processors interrupts are sent across the processor bus coupled to the IA-32 processors, the bridge converting an inter-processor interrupt from the processor bus to an interrupt transaction on the system bus.

13. The apparatus of claim 6, wherein the bridge issues an interrupt acknowledge and obtains an external interrupt vector from the external PIC before asserting the external interrupt on the IA-32 processor.

14. A method for distributing interrupts in a computer system, comprising:
    receiving an interrupt transaction at a system bus, wherein the interrupt transaction includes a target IA-32 processor identification, and wherein the system bus includes a plurality of nodes, each of the plurality of nodes including a bridge and a plurality of IA-32 processors coupled to the bridge;
    reading the target IA-32 processor identification using the bridge at each node of the plurality of nodes;
    converting the interrupt transaction into an interrupt signal at the bridge; and
    asserting the interrupt signal at a target IA-32 processor.

15. The method of claim 14, wherein each node of the plurality of nodes includes a unique node identification and each IA-32 processor of the plurality of IA-32 processors includes a unique processor identification, and wherein the target IA-32 processor identification includes the unique node identification and the unique IA-32 processor identification.

16. The method of claim 14, wherein each of the IA-32 processors includes a first interrupt pin and a second interrupt pin, the method further comprising:

asserting a non-maskable interrupt at the first interrupt pin;

asserting an external interrupt at the second interrupt pin;

generating an interrupt acknowledge for the external interrupt; and returning an interrupt vector to the target IA-32 processor, the interrupt vector identifying the external interrupt.

17. The method of claim 14, wherein the computer system comprises a processor bus coupled to the bridge and the plurality of IA-32 processors, and an input/output (I/O) controller and a memory controller coupled to the system bus, wherein the I/O controller delivers interrupts as transactions to the system bus.

18. The method of claim 17, wherein the memory controller, the I/O controller and the system bus are IA-64 components.

19. A method for distributing interrupts in a computer system, comprising:

receiving an interrupt transaction at a system bus, wherein the interrupt transaction includes a target IA-32 processor identification, wherein the system bus includes a plurality of nodes, each of the plurality of nodes including a bridge and a plurality of IA-32 processors coupled to the bridge;

reading the target IA-32 processor identification using the bridge at each node of the plurality of nodes;

converting the interrupt transaction into an interrupt signal at the bridge; and asserting the interrupt signal at a target IA-32 processor, wherein the bridge, comprises:

a priority and threshold mechanism that controls distribution of the interrupts to the plurality of IA-32 processors coupled to the bridge; and a buffer that stores interrupt transactions for assertion to the plurality of IA-32 processors coupled to the bridge, wherein the priority and threshold mechanism comprises:

a programmable task priority register, wherein the task priority register may be set to prevent delivery of interrupts having the lower priority than the value programmed into the task priority register;

a processor priority register that records the priority value of the first interrupt sent to the target IA-32 processor, wherein a second interrupt may be asserted at the IA-32 processor when an interrupt priority of the second interrupt is greater than the priority value of the first interrupt; and a pending interrupt register comprising the plurality of bits corresponding to the plurality of possible interrupt vectors, wherein a bit identifies a normal interrupt that may be asserted at the IA-32 processor.

20. A system for distributing interrupts, comprising:

a first bus that supports an interrupt transaction indicating an interrupt;

a second bus coupling a plurality of processors; and a bridge comprising means for monitoring transactions on the first bus, the bridge connecting the first bus and the second bus, wherein the interrupt is targeted at a processor of the plurality of processors, the interrupt transaction including an identity of a target processor and wherein the bridge reads the identity to determine the target processor, converts the interrupt transaction into an interrupt signal, and asserts the interrupt signal at the target processor.

21. A method for distributing interrupts in a computer system, comprising:

receiving an interrupt transaction at a system bus, wherein the interrupt transaction includes a target IA-32 processor identification, and wherein the system bus includes a plurality of nodes, each of the plurality of nodes including a bridge and a plurality of IA-32 processors coupled to the bridge, wherein the bridge, comprises:

a priority and threshold mechanism that controls distribution of interrupts to the IA-32 processors coupled to the bridge; and a buffer that stores interrupt transactions for assertion to the IA-32 processors coupled to the bridge, wherein the priority and threshold mechanism comprises:

a programmable task priority register, wherein the task priority register may be set to prevent delivery of interrupts having a lower priority than a value programmed into the task priority register;

a processor priority register that records a priority value of a first interrupt sent to an IA-32 processor, wherein a second interrupt may be asserted at the IA-32 processor when an interrupt priority of the second interrupt is greater than the priority value of the first interrupt; and a pending interrupt register, the pending interrupt register comprising a plurality of bits corresponding to a plurality of possible interrupt vectors, wherein a bit identifies a normal interrupt that may be asserted at the IA-32 processor;

reading the target IA-32 processor identification using the bridge at each node of the plurality of nodes;

converting the interrupt transaction into an interrupt signal at the bridge; and asserting the interrupt signal at a target IA-32 processor.

* * * * *